Oct. 8, 1935.　　　　B. S. ECKHAUS　　　　2,016,488
CONTAINER
Filed Feb. 16, 1933　　　　2 Sheets-Sheet 1
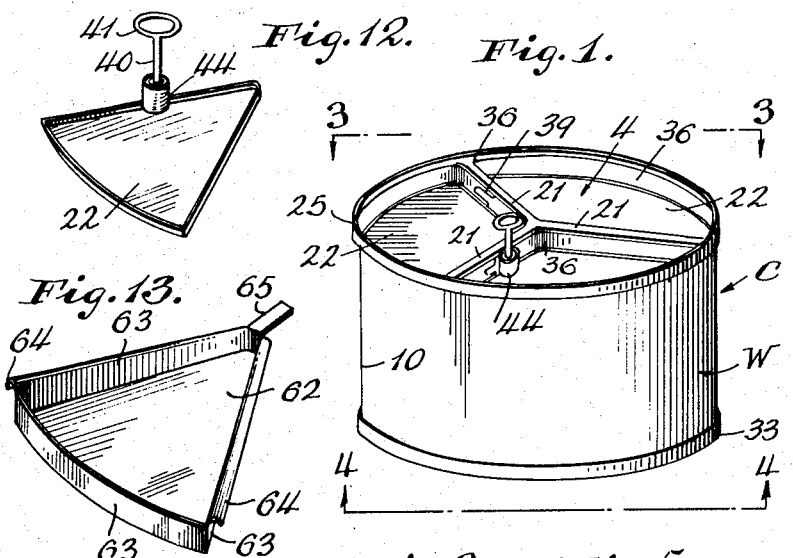
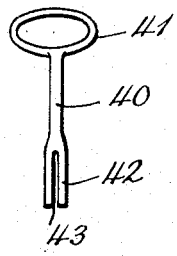
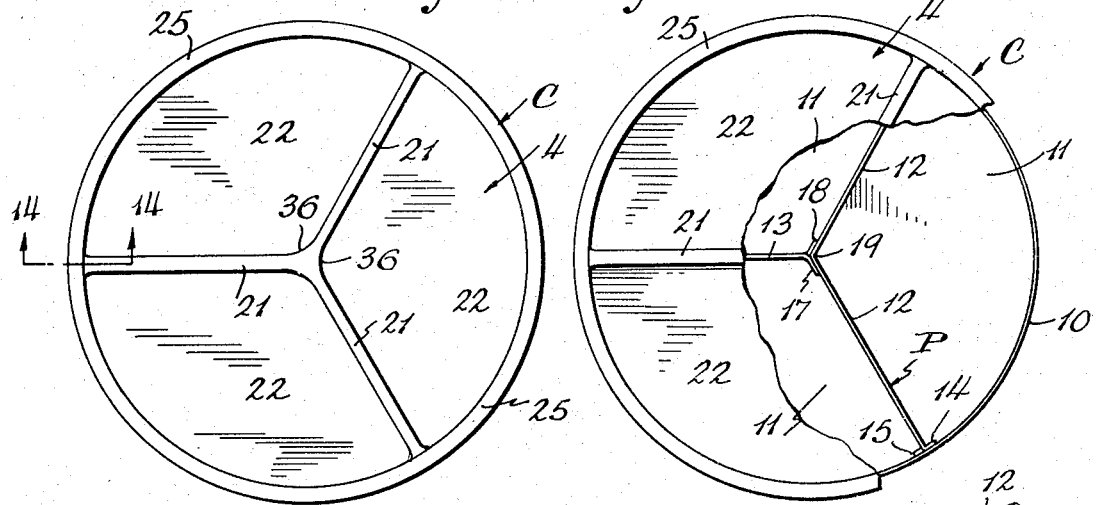
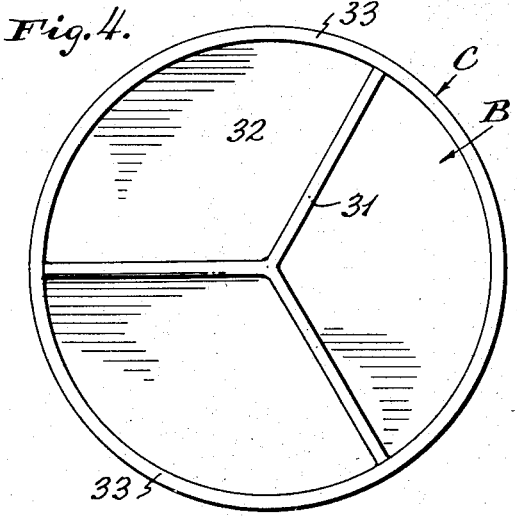
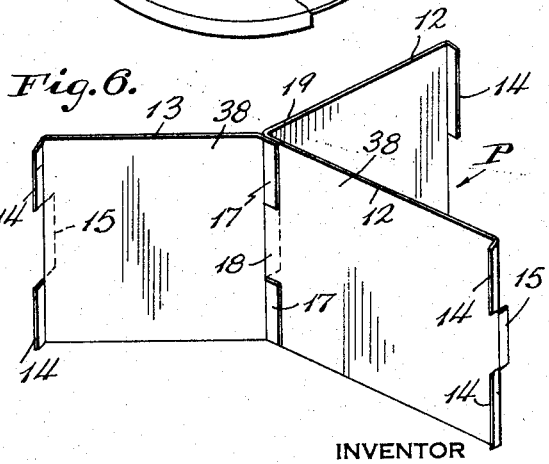
INVENTOR
BENJAMIN S. ECKHAUS
BY Oscar A. Geier
ATTORNEY Oct. 8, 1935.  B. S. ECKHAUS  2,016,488
CONTAINER
Filed Feb. 16, 1933   2 Sheets-Sheet 2
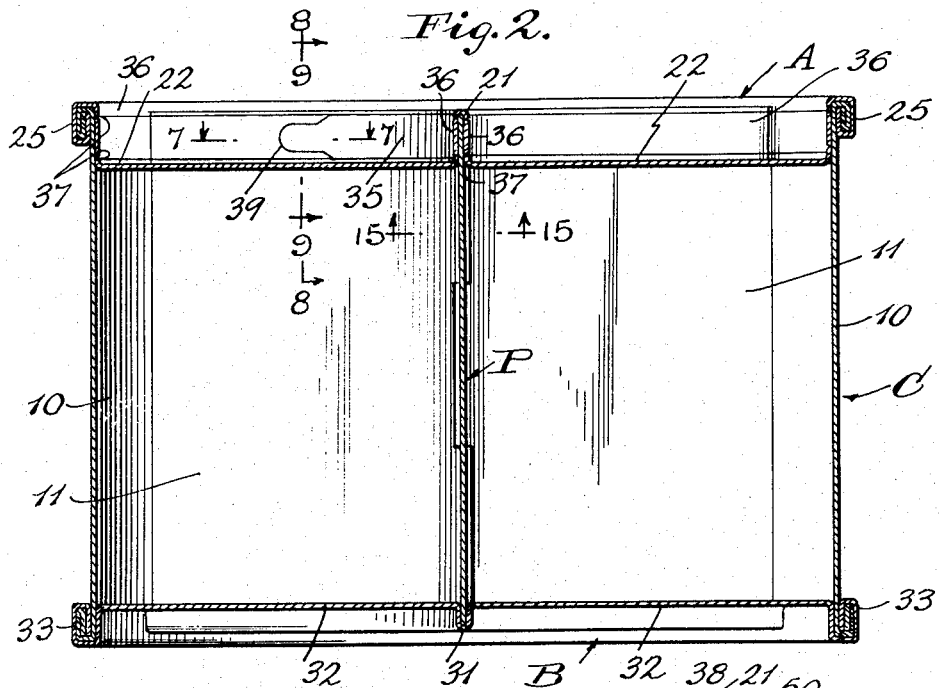
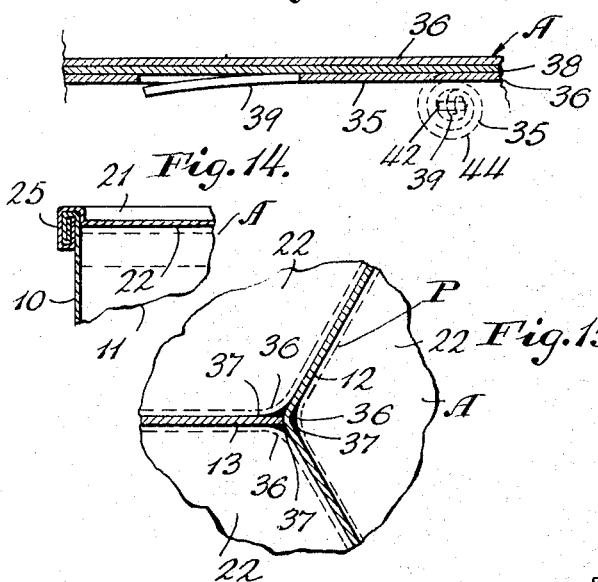
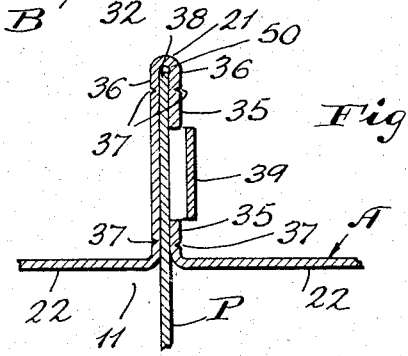
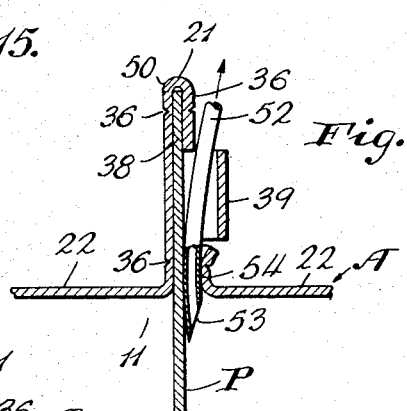
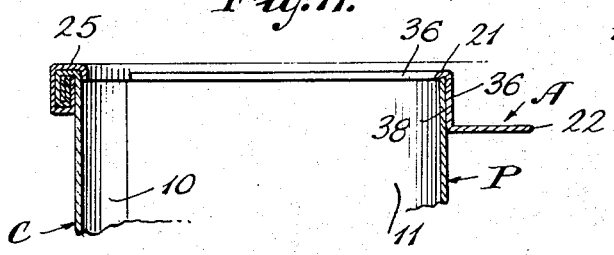
INVENTOR
BENJAMIN S. ECKHAUS
BY Oscar A. Geier
ATTORNEY Patented Oct. 8, 1935

2,016,488

UNITED STATES PATENT OFFICE 2,016,488

CONTAINER

Benjamin S. Eckhaus, Brooklyn, N. Y.

Application February 16, 1933, Serial No. 657,035

1 Claim. (Cl. 220—20)

The present invention relates to improvements in containers and it particularly relates to containers for shredded, granular, or pulverized products, such as foodstuff, coffee and tobacco, which are subject to more or less deterioration when exposed to the atmosphere and to the loss of their desirable qualities and properties and the freshness, aroma and other desirable properties of which may be preserved by being packed away from the air.

It has been found very desirable to store many of these products and materials under vacuum or in inert atmosphere. For example, it has been found that coffee in granular or pulverized form, will gradually deteriorate as far as flavor and fragrance are concerned if permitted to stand for long periods of time in the presence of the atmosphere, the oxygen of such atmosphere appearing to cause certain changes in the desirable flavoring constituents. However, after coffee is processed ready for outside use it must be packed and distributed to the consumer, this distribution usually extending over a considerable period of time.

It has been found possible to maintain the flavor of coffee during this distribution period by utilizing hermetically sealed cans from which the atmospheric oxygen has been substantially exhausted. However, when such cans reach the household or consumer and are opened the vacuum is immediately lost, exposing the entire contents to atmospheric action. These containers will stand on the shelves or in the closets for a considerable length of time during usage. As a result, the larger portion of the coffee contained therein will have lost most of the various effects of a vacuum pack before actual consumption.

An object of the present invention is to provide a convenient package which will be inexpensive and which may be readily distributed through the ordinary channels of the trade and which will preserve the contents from the deteriorating influences of the atmosphere, both before usage by the consumer and also throughout usage by the consumer.

Another object is to provide a simple, inexpensive and light weight container for products and materials as above described from which portions, to be substantially immediately utilized, may be removed without opening the portions of the container holding the remainder of the contents.

Another object is to provide a new and improved inexpensive relatively simple vacuum container for products and materials which, although it contains a plurality of separated compartments, nevertheless may be readily exhausted as to air in the compartments by ordinary vacuum means, and which may be opened in sections so that only one compartment at a time will be exposed to atmospheric influences.

Other objects will be obvious and will appear in the course of the specification.

In accomplishing the objects of the present invention it has been found most convenient to provide a container or can of metallic plate or sheet construction, preferably of cylindrical form. The container is provided with suitable partitioning means preferably taking the form of sector plates, which will divide the interior of said can or container into a plurality of compartments.

The cover for the container may be designed so as to have sections corresponding to the various partitions and so as to interlock with said partitions to form a partitioned container in which each compartment, and the compartments as a whole, will be hermetically sealed from each other and from the atmosphere.

The various separated compartments are preferably arranged as to come together at a common point, preferably the axis or center of the container or can, to which point may be applied suitable vacuum connections or, if desired, each compartment of itself be provided with a suitable vacuum connection.

The cover of the can or container is preferably so constructed that by means of the usual rip key and rip strip, portions of the cover may be removed, exposing the compartment from which it is desired to remove the contents without opening or exposing the other compartments.

The present invention also contemplates the construction of the cover and the container as a whole so that when a compartment is opened a temporary cover may be provided to effectively decrease the circulation of the atmosphere through or into contact with the contents thereof.

The above and other objects will appear more clearly from the following detailed description, when taken in connection with the accompanying drawings, which illustrate a preferred embodiment of the inventive idea.

In the drawings:

Fig. 1 is a top perspective view of the container showing the rip key in position and part of the rip strip removed from one of the sections.

Fig. 2 is a side sectional view upon an enlarged scale of the container upon the line 2—2 of Fig. 1.

Figs. 3 and 4 are respectively top and bottom views of the container upon the lines 3—3 and 4—4 of Fig. 1.

Fig. 5 is a top view with the cover partly removed diagrammatically illustrating the interior construction.

Fig. 6 is a perspective view illustrating the internal partitions.

Fig. 7 is a fragmentary sectional view on the line 7—7 of Fig. 2, illustrating how the vacuum connection may be applied and how the strip may be ripped from the container, upon the line 7—7 of Fig. 2.

Fig. 8 is a fragmentary side sectional view upon an enlarged scale also illustrating how the vacuum connection may be applied, upon the line 8—8 of Fig. 2.

Fig. 9 is a fragmentary side sectional view also upon an enlarged scale illustrating the position of the tongue of the rip strip.

Fig. 10 shows a relatively simple rip key in side elevation.

Fig. 11 is a fragmentary side elevation of part of a compartment after the rip strip has been removed.

Fig. 12 is a perspective view illustrating the compartment or section cover after the strip has been completely ripped from the container and the section has been opened.

Fig. 13 is a perspective view of a temporary cover arrangement.

Fig. 14 is a detailed side sectional view taken upon the line 14—14 of Fig. 3, and Fig. 15 is a detailed bottom view of the connection between the partition and the cover, taken upon the line 15—15 of Fig. 2.

In the drawings the container C is provided with a cover A, a bottom B and an interior partitioning arrangement P.

The side wall 10 of the container C preferably is of cylindrical shape although it may be of prismatic, conical, pyramidal or other suitable contours. The side wall 10 preferably consists of one or more strips or sections of metal, the edges of which are folded on one another and/or are suitably connected by a fluid and liquid-tight attachment (not shown).

The partitioning may be formed in any suitable manner so as to divide the interior of the can or container into a plurality of compartments of desired size and shape.

The partitions may be radially arranged, as shown, or they may be parallelly arranged either vertically or horizontally.

The partitions may be made of separate metal sections which are afterwards connected to the walls of the containers and/or they may be made integral with portions of the wall and folded inwardly to form one or more of the partitions.

As shown, the partitioning walls are all made in one unit assembly, but if desired these partitioning walls could be made separately and attached to the walls separately and/or assembled together inside of the can.

The partitioning arrangement P which is shown in the container in Figs. 2 and 5 and removed from the container in Fig. 6, divides the container into three cylindrical sectors 11 of approximately equal volume, but this arrangement may be readily varied so as to divide the container into any suitable number of separated compartments.

Referring to Fig. 6 the partitioning arrangement P is composed of two metal sheets or plates 12 and 13, the edges of which are provided with oppositely disposed flanges. The flanges 15 and 14 which are provided at the outer edges of the sheet members 12 and 13 are preferably curved and are adapted to contact closely with the interior side walls of the container C so as to form an air-tight connection as by soldering or welding.

It will be noticed that the tongues 14 and 15 may be formed directly from the end portions of the plates 13 and 12, by dividing the excess length of such plates into three segments, of equal height, the upper and lower segments being bent in one direction and the middle segment being bent in an opposite direction. This staggering of the flanges or segments 14 or 15 will assure a strong soldered or welded connection to the interior side wall of the container and will also assure that the compartments will be maintained hermetically sealed from each other.

As shown in Fig. 6, the partitioning sheet 12 is about twice the length of the partitioning sheet 13 with the result that the partitioning sheet 12 forms one of the partitioning walls while the partitioning sheet 13 forms the other partitioning wall. The sheet 12 is preferably bent at an angle of 120°, as indicated, and the inside or central end of the partitioning wall or sheet 13 is provided with flanges 17 and 18 which fit around the corner 19 of the bent double partition wall 12. The flanges 17 and 18 also assure a rigid soldered or welded connection between the double partition wall 12 and the single partition wall 13 and a fluid-tight connection.

The cover element A (see Figs. 1, 2, 3 and 5) is provided with a series of ridges 21 having the depressed portions 22, the ridges 21 being designed to fit over and cooperate with the partition walls 12 and 13, as shown in Figs. 2, 8 and 9. The edge of the cover, (see Figs. 2 and 14) is preferably rolled with the upper edge of the side wall 10 of the container, as indicated at 25, the two edges being closely wedged together so as to form an air-tight connection around the entire periphery of the container.

The bottom B is similarly provided with elevated ridges 31 and depressions 32, the ridges 31 and the depressions 32 cooperating with the partition walls 12 and 13. The outer edge of the bottom is rolled with the lower edge of the side wall 10, as indicated at 33, to form a fluid-tight connection around the entire periphery of the can.

The ridges 21 on the cover A are made of greater height than the ridges 31 on the bottom B in order to provide for the ripping strip 35 which extends entirely around the side walls 36 of the ridges 21 of said cover A. The ripping strip 35 is formed on the side walls 36 of the ridge 21 of the cover A by the indentations or scoring 37, see particularly Fig. 9, which extends entirely around the side walls 36. Along one side wall 36, and preferably the side wall which contacts with the upper portion 38 of the partitioning walls 12 and 13 is positioned the tongue 39 (see Figs. 1, 2, 7, 8 and 9) which tongue has been completely cut out from the side wall and is bent out away from the side wall 36, as indicated in Figs. 7 to 9.

The tongue 39 is designed to cooperate with the key of Fig. 10. Only one key is provided in the embodiment shown, but it is to be understood that a separate key may be provided for each compartment if desirable. The key of Fig. 10 has a shank 40, a finger gripping portion 41 and a clevis portion 42 having a central opening 43 which is adapted to fit over the tongue 39 and enable the strip 35 to be raised from the side wall 36, as indicated in Figs. 1 and 7 at 44. It will be noted in Figs. 1 and 2 that the rip strip 35 will wind itself conveniently around the clevis portion 42 of the key 40 so that the entire cover 22 may be removed, as indicated in Fig. 12.

This ripping or opening operation may be performed upon the separate compartments to remove the individual compartment covers 22 without affecting the vacuum upon the other compartments, or without admitting atmosphere to the other compartments, whether there be a vacuum or an inert gas therein. The appearance of the wall after the removal of the rip strip is indicated in Fig. 11 and it will be noted that the opposite side wall 36 still remains in undisturbed contact with the top portion of the partitioning walls 12 and 13.

Although the vacuum may be applied or the inert gas may be introduced in a wide variety of ways, it has been found satisfactory to apply the vacuum in connection with the sealing of the cover to the top of the receptacle or container C and at the position of the tongue 39, as indicated in Figs. 2, 7 and 8.

As described before, the partition walls 12 and 13 are attached in a fluid-tight manner by soldering or welding to each other and to the cylindrical wall 10 of the container. The ridged cover A and the ridged bottom B are then fitted over the top and bottom of the can, the edges being rolled with the side walls 10 as indicated at 23 and 25, respectively, so that a fluid-tight connection will be formed along the peripheries. Then the sides of the ridges 21 on the cover A and 31 on the bottom B, are connected in a gas-tight fashion as by welding or soldering to the upper and lower portions respectively of the partition walls 12 and 13. The connection of the cover to the upper side wall 10 and to the top of the partitions 12 and 13, is, of course, initiated after the compartment 11 has been filled with the desired material, such as coffee or any other desired materials as above described.

A soldered connection is indicated at 50 in Figs. 8 and 9, along the top of the ridge above the upper portion 38 of the partition walls 12 and 13 and this connection is completed except for the portion of the side wall 36 adjacent the tongue 39 where the vacuum connection is to be applied in the manner now described.

As shown in Figs. 2, 7 and 8, the vacuum connection 52 may take the form of a metallic tube having a lowered bevelled end 53 which may be conveniently inserted between the lower portion 54 of the side wall 36 (see Fig. 8) and between the upper portion 38 of the partition walls 12 and 13. After the vacuum has been applied for a suitable length of time the tube 52 may be withdrawn and the opening between the lower portion 54 of the wall 36 and the partition wall 38 simultaneously sealed. The container will now be ready for storage, shipping and distribution.

When the container comes into the hands of the consumer the key or keys 40 will be supplied therewith and the consumer may, by inserting the clevis 42 about the tongue 39, remove a section of the cover 22 without disturbing the other sections which will be maintained under vacuum. It will be noted that the clevis 42 is of such construction that it may be readily removed from the cover section 22 and applied to another section when the contents of any one compartment 11 have been completely consumed. The compartments 11 are preferably made of such volume and size so that they will contain sufficient coffee or other material for one day or for several days, the volume and size being so regulated that the contents thereof will be consumed before prolonged contact with the atmosphere results in any substantial deterioration.

The present invention also contemplates the filling of the various compartments with various atmospheres such as carbon dioxide or nitrogen, etc., which would be advantageous in connection with many food products, as it would not cause a change in the texture or granular form of the materials and, moreover, would not result in any decrease in the volatile constituents thereof, as would be caused by vacuum application. Another advantage of an inert atmosphere such as carbon dioxide or nitrogen, which may be applied under greater pressure than air pressure so that any possible leakage would be outward from the can rather than an inward leakage of the atmosphere, resides in the fact that even when one of the compartments is opened there will not be any sudden inrush of air, as occurs in the case of the vacuum pack.

In Fig. 15 is illustrated the soldering connection at the meeting point of the ridges 21 at the axis of the can. It will be noted at this point that the side walls 36 are necessarily rounded so that an open space 37 would be formed which should be filled with solder, as indicated.

It is to be understood that many modifications and alterations may be made in the specific illustration of the invention without departing from the scope thereof. For example, the various compartments 11 may be formed of separate can sectors, the walls of which may be soldered together or which may be readily tied together by any suitable metallic means. These separate cans may be assembled into a single unit or container, as shown in Figures 1 and 2 and a single cover element A or individual cover elements 22 may be employed for each section.

The present invention also contemplates the utilization of a temporary cover, shown in Fig. 13, which may be applied to the various sections or compartments 11 after the cover elements 22, as indicated in Fig. 12, have been removed. These temporary covers are provided with a base 62 corresponding to the element 22 of the cover A and with side walls 63 which take the place of the side portions 36 of the ridges 21. The side walls 63 are provided with lips 64 which fit over the residual portion of the ridges shown in Fig. 11. The inner or apex of the temporary cover is provided with an outwardly extending lip 65 which provides a handle or grasping portion for lifting off the cover.

It is obvious that many changes, alterations and modifications could be made in the specific embodiment of the present invention without avoiding the spirit thereof and it is intended to include all such embodiments, alterations and changes as will come within the scope of the appended claims. The present invention in general contemplates a container construction arrangement for retaining the advantageous effects of vacuum packing for a longer period of time than is now possible with the present containers and contemplates such retention even though the container be opened and portions of the material or product therein be removed or consumed. Other arrangements, of course, could be used and multiple compartments as shown in a unit container and the specific container may be constructed in a wide variety of ways and methods. For example, the entire container may be folded out of a single sheet of metal with partitions, cover, bottom and side elements all folded out of the same sheet. The compartments may be opened by ripping out or otherwise removing portions of the side walls.

In such an embodiment, particularly in the case of containers of pyramidal or prismatic form it would be most convenient to provide the side elements with rip strips and key elements which would function similarly to those already described in connection with the embodiment illustrated.

When an inert atmosphere is utilized it is possible, particularly under superatmospheric pressures, to avoid separate compartments which must be individually opened to remove portions of the contents of the container. In such a case the material or produce to be packed in the container may be placed under substantially atmospheric pressure so that upon opening a check valve device in the side, bottom or top of the container, the compressed gas will eject an amount of the contents as may be suitable. As soon as a desirable proportion of the contents have been removed the check valve device may be closed to retain the remainder of the contents in the inert atmosphere and under residual pressure. This check valve device may be conveniently actuated in a large variety of ways, as for example, by inverting the can or by outside application of an actuating device. The side lines 36 shown on Fig. 8 appear on the outside of the wall 36 but they may also preferably be placed on the inside of the wall adjacent the upper portion 38 of the partitioning device.

What is claimed is:

A vacuum container for materials and products, which are to be maintained out of contact with the atmosphere and at substantially subatmospheric pressure before actual consumption, which contains a plurality of compartments which are sealed in an air-tight manner from each other and from the exterior and which may be independently opened, and said container being provided with side walls, internal partitioning walls forming the compartments and cover and base elements attached in an air-tight fashion to said side walls and said partitioning walls to form a complete air-tight enclosure, said side walls, said internal partitioning walls and said cover and base element together forming the sides of said compartments, the attachment of said side walls, internal partitioning walls and covering base elements to each other being of such permanency as not to be affected by the independent opening of any of said compartments and each of said compartments being provided with means to permit opening thereof by substantially complete removal of its side formed by the cover element and without affecting said permanent attachment, said removal being effective inside of said attachment, said permanent attachment being of such a character that it will permit of convenient vacuum application to the container after filling and before final sealing.

BENJAMIN S. ECKHAUS.